United States Patent Office.

ROBERT W. RUSSELL, OF BROOKLYN, AND THOMAS HOWLAND, OF STOCKPORT, NEW YORK.

Letters Patent No. 70,474, dated November 5, 1867.

---

PREPARATION OF PAPER-PULP FROM REEDS, &c.

---

*The Schedule referred to in these Letters Patent and making part of the same.*

---

TO ALL WHOM IT MAY CONCERN:

Be it known that we, ROBERT W. RUSSELL, of the city of Brooklyn, in the State of New York, and THOMAS HOWLAND, of Stockport, in Columbia county, in the State of New York, have discovered and invented a new and useful Method and Process for Making Paper-Pulp, Papier-Maché, and other materials, from reeds, cane, bamboo, or hemp stalks, or other vegetable fibrous substances, and a new article of manufacture, that is to say, pulp suitable for the manufacture of paper, papier-mache, box-board, pasteboard, paper-board, felted pulp, and other articles, made from reeds, cane, bamboo, or hemp stalks, or other fibrous vegetable substance, which has been subjected to Lyman's steam-blowing process, and then beaten into pulp, either with or without any treatment with chemicals; and we do hereby declare that the following is a full, clear, and exact description thereof.

The cane, reeds, bamboo, or other vegetable fibrous substances, we cause to be first subjected to the steam-blowing process for which a patent was granted by the United States to Azel S. Lyman, on the 3d August, 1858.

We have discovered that the steam-blown material, after being beaten up in a rag-engine, without any chemical or other preliminary treatment, will felt, and can be run off into paper, in the same way as paper is manufactured from pulp made from straw, wood, and other fibrous substances which have been boiled in alkaline solutions. This result is due to the fact that the steam-blowing process produces an effect similar to that of the rotting process upon flax-straw, and similar to the process of maceration applied to manilla and various other vegetable fibrous substances.

By the steam-blowing process the fibrous substances are partially disintegrated. The heat of the steam changes the nature or condition of the gums or cementing matter holding the fibres together, so that such gums or cementing matter can be easily washed out or otherwise got rid of. The silex is dissolved or softened, and shattered and blown from the fibres, and the pith and other worthless matter is converted into dust, and the intercellular tissue of the vegetable fibrous substances which have been subjected to the steam-blowing process is, by the action of the rag-engine, eliminated from the cellulose sufficiently to insure the felting of the fibres, from which the gums and other cementing matters have been washed out. By this simple process a material can be obtained which, on account of its cheapness, will be available for many new manufactures.

We have also discovered that when vegetable substances which have been subjected to the said steam-blowing process are to be treated with caustic alkali or other chemicals, for the manufacture of a fine quality of paper or felt, such steam-blown material should be beaten, ground, crushed, or bruised, and washed, before the application of the chemicals.

The beating, grinding, crushing, or bruising, and washing of the steam-blown material may be done in a paper-maker's beating or rag-engine, or by any other or well-known and suitable mode of beating, grinding, crushing, or bruising, and washing similar substances. It is convenient to beat, grind, crush, or bruise, and wash the said steam-blown material at one and the same time, but the washing may be done, wholly or partly, after the beating, grinding, crushing, or bruising as aforesaid.

The vegetable fibrous substances having been thus disintegrated and prepared for washing, and having been washed as aforesaid, and thereby deprived of a large part of the acid, gum, gluten, resinous, cementing, coloring, and other worthless and obnoxious matter, can be reduced to superior paper-pulp, papier-mache, and other valuable materials, much quicker and more economically, and with the use of a smaller quantity of chemicals, and with a less degree of heat, than would be required if the steam-blown material had not been so prepared and cleansed as aforesaid. The quality of the product is also much better than it would be if the said fibrous substances, after being steam-blown as aforesaid, were without such cleansing preparation subjected to a boiling in chemical solutions with such worthless and obnoxious matters, which neutralize a large portion of the chemicals used.

The material thus prepared may be boiled in any of the ordinary chemical solutions used in the boiling of straw, wood, and other vegetable fibrous substances, to convert the same into paper-pulp and papier-mache, such as soda-ash made caustic with lime, or the caustic soda of commerce, or soda-ash, or sal-soda, or potash, or caustic potash, or lime, lime-water, or milk of lime, according to the quality of the material to be manufactured.

After the boiling in a chemical solution has been completed, the material is to be treated in the usual way, to be made into paper, papier-maché, and other products.

Prior to our said discovery and invention it was not known that the said steam-blown material could be made into paper without the use of chemicals, and the advantage of the said cleansing process, as a preliminary to the application of chemicals to the said steam-blown material, was not known. But the steam-blown material not having been subjected to the said cleansing process before the boiling in chemical solutions as aforesaid, a small portion only of the acid, gummy, resinous, and cementing matter has been got rid of before such boiling, and the greater part of such matter went into the tank or boiler on such boiling, and absorbed much of the chemicals used therein, besides causing the product to be inferior.

What we claim as our discovery and invention, and desire to secure by Letters Patent, is—

1. The above-mentioned process of making paper-pulp, papier-maché, and other articles from vegetable fibrous substances, disintegrated as aforesaid by the said steam-blowing process, without maceration, boiling, or chemicals.

2. The method of treating vegetable fibrous substances which have been subjected to the said steam-blowing process for the purposes aforesaid, by beating, grinding, crushing, or bruising, and washing the same, before the boiling of the same in any chemical solution, substantially as described.

3. The new articles of manufacture above described, that is to say, pulp of different kinds, suitable for the manufacture of paper and papier-maché, box-board, pasteboard, paper-board, felted-pulp, and other articles, made either with or without the use of chemicals, substantially as above described.

Dated 13th August, 1867.

R. W. RUSSELL,
THOS. HOWLAND.

Witnesses:
 E. C. HALLIDAY,
 WM. P. ARNOLD.